(12) United States Patent
Macbeth et al.

(10) Patent No.: US 7,836,002 B2
(45) Date of Patent: Nov. 16, 2010

(54) ACTIVITY-CENTRIC DOMAIN SCOPING

(75) Inventors: Steven W. Macbeth, Snohomish, WA (US); Roland L. Fernandez, Woodinville, WA (US); Brian R. Meyers, Issaquah, WA (US); Desney S. Tan, Kirkland, WA (US); George G. Robertson, Seattle, WA (US); Nuria M. Oliver, Seattle, WA (US); Oscar E. Murillo, Seattle, WA (US)

(73) Assignee: Microsoft Corporation, Redmond, VA (US)

( * ) Notice: Subject to any disclaimer, the term of this patent is extended or adjusted under 35 U.S.C. 154(b) by 763 days.

(21) Appl. No.: 11/426,796

(22) Filed: Jun. 27, 2006

(65) Prior Publication Data

US 2007/0299949 A1 Dec. 27, 2007

(51) Int. Cl.
 *G06N 5/04* (2006.01)
(52) U.S. Cl. .............................. 706/46; 706/20; 706/21; 706/45; 706/52; 706/55; 706/62; 704/200; 704/202; 704/259
(58) Field of Classification Search ............. 706/14–18, 706/20, 21; 704/1–10, 200, 202, 259; 715/700, 715/707, 708, 727–728
See application file for complete search history.

(56) References Cited

U.S. PATENT DOCUMENTS

| | | | |
|---|---|---|---|
| 5,530,861 A | 6/1996 | Diamant et al. | |
| 5,737,728 A | 4/1998 | Sisley et al. | |
| 5,999,911 A | 12/1999 | Berg et al. | |
| 6,112,243 A | 8/2000 | Downs et al. | |
| 6,141,649 A | 10/2000 | Bull | |
| 6,307,544 B1 | 10/2001 | Harding | |
| 6,513,031 B1 * | 1/2003 | Fries et al. | 707/3 |
| 6,571,215 B1 | 5/2003 | Mahapatro | |
| 6,601,233 B1 | 7/2003 | Underwood | |
| 6,727,914 B1 | 4/2004 | Gutta | |
| 6,757,887 B1 | 6/2004 | Kaplan | |
| 6,799,208 B1 | 9/2004 | Sankaranarayan et al. | |
| 7,017,146 B2 | 3/2006 | Dellarocas et al. | |

(Continued)

OTHER PUBLICATIONS

Bardram. "Activity-Based Computing—Lessons Learned and Open Issues" (Apr. 20, 2004) 1st International Workshop on Computer Support for Human Tasks and Activities, 5 pages.

(Continued)

*Primary Examiner*—Michael B. Holmes
*Assistant Examiner*—Omar F Fernandez Rivas
(74) *Attorney, Agent, or Firm*—Shook, Hardy, Bacon LLP

(57) ABSTRACT

A system that can automatically narrow the search space or recognition scope within an activity-centric environment based upon a current activity or set of activities is provided. In addition, the activity and context data can also be used to rank the results of the recognition or search activity. In accordance with the domain scoping, natural language processing (NLP) as well as other types of conversion and recognition systems can dynamically adjust to the scope of the activity or group of activities thereby increasing the recognition systems accuracy and usefulness. In operation, a user context, activity context, environment context and/or device profile can be employed to effectuate the scoping. As well, the system can combine context with extrinsic data, including but not limited to, calendar, profile, historical activity data, etc. in order to define the parameters for an appropriate scoping.

16 Claims, 8 Drawing Sheets

U.S. PATENT DOCUMENTS

| | | | |
|---|---|---|---|
| 7,020,652 B2 | 3/2006 | Matz et al. | |
| 7,058,947 B1 | 6/2006 | Raja et al. | |
| 7,062,510 B1 | 6/2006 | Eldering | |
| 7,089,222 B1 | 8/2006 | Lannert et al. | |
| 7,136,865 B1 | 11/2006 | Ra et al. | |
| 7,155,700 B1 | 12/2006 | Sadhu et al. | |
| 7,194,685 B2 | 3/2007 | Morrison | |
| 7,194,726 B2 | 3/2007 | Allen et al. | |
| 7,363,282 B2 | 4/2008 | Karnawat et al. | |
| 7,389,514 B2 | 6/2008 | Russell et al. | |
| 7,562,346 B2 | 7/2009 | Jhanwar et al. | |
| 7,562,347 B2 | 7/2009 | Baumgart et al. | |
| 7,647,400 B2 | 1/2010 | Abbott et al. | |
| 2001/0040590 A1 | 11/2001 | Abbott et al. | |
| 2002/0065701 A1 | 5/2002 | Kim et al. | |
| 2002/0152102 A1 | 10/2002 | Brodersen et al. | |
| 2003/0004763 A1 | 1/2003 | LaBlanc et al. | |
| 2003/0046401 A1 | 3/2003 | Abbott et al. | |
| 2003/0130979 A1 | 7/2003 | Matz et al. | |
| 2003/0135384 A1 | 7/2003 | Nguyen | |
| 2003/0182651 A1 | 9/2003 | Secrist et al. | |
| 2004/0039627 A1 | 2/2004 | Palms et al. | |
| 2004/0093593 A1 | 5/2004 | Jhanwar et al. | |
| 2004/0133457 A1 | 7/2004 | Sadiq et al. | |
| 2004/0143477 A1 | 7/2004 | Wolff | |
| 2004/0179528 A1 | 9/2004 | Powers et al. | |
| 2004/0219928 A1 | 11/2004 | Deeds | |
| 2004/0243774 A1 | 12/2004 | Horvitz | |
| 2004/0261026 A1 | 12/2004 | Corson | |
| 2005/0080625 A1* | 4/2005 | Bennett et al. | 704/249 |
| 2005/0086046 A1* | 4/2005 | Bennett | 704/2 |
| 2005/0091098 A1 | 4/2005 | Brodersen et al. | |
| 2005/0097559 A1 | 5/2005 | He | |
| 2005/0138603 A1 | 6/2005 | Cha | |
| 2005/0144004 A1* | 6/2005 | Bennett et al. | 704/270.1 |
| 2005/0232423 A1 | 10/2005 | Horvitz et al. | |
| 2006/0004680 A1* | 1/2006 | Robarts et al. | 706/12 |
| 2006/0004891 A1 | 1/2006 | Hurst-Hiller et al. | |
| 2006/0010206 A1* | 1/2006 | Apacible et al. | 709/205 |
| 2006/0015387 A1* | 1/2006 | Moore et al. | 705/8 |
| 2006/0015478 A1 | 1/2006 | Beringer et al. | |
| 2006/0015479 A1* | 1/2006 | Wood et al. | 707/2 |
| 2006/0048059 A1 | 3/2006 | Etkin | |
| 2006/0065717 A1 | 3/2006 | Hurwitz et al. | |
| 2006/0107219 A1 | 5/2006 | Ahya et al. | |
| 2006/0195411 A1 | 8/2006 | Knight et al. | |
| 2006/0212331 A1 | 9/2006 | Lundberg et al. | |
| 2006/0241997 A1 | 10/2006 | Bhatawdekar et al. | |
| 2006/0242651 A1 | 10/2006 | Zielinski et al. | |
| 2006/0282436 A1 | 12/2006 | Chaudhuri et al. | |
| 2006/0293933 A1 | 12/2006 | Millhouse et al. | |
| 2007/0033640 A1 | 2/2007 | Herness et al. | |
| 2007/0067199 A1 | 3/2007 | Shine et al. | |
| 2007/0106497 A1* | 5/2007 | Ramsey et al. | 704/9 |
| 2007/0118804 A1 | 5/2007 | Raciborski et al. | |
| 2007/0191979 A1 | 8/2007 | Zeng et al. | |
| 2007/0198969 A1 | 8/2007 | Facemire et al. | |
| 2007/0219798 A1* | 9/2007 | Wang et al. | 704/257 |
| 2007/0276715 A1 | 11/2007 | Beringer et al. | |
| 2007/0282659 A1 | 12/2007 | Bailey et al. | |

OTHER PUBLICATIONS

Final Office Action in U.S. Appl. No. 11/426,846 mailed Jan. 6, 2010.
Office Action in U.S. Appl. No. 11/426,830 mailed Mar. 31, 2010.
Office Action in U.S. Appl. No. 11/426,788 mailed Apr. 26, 2010.
Notice of Allowance in U.S. Appl. No. 11/426,827 mailed May 5, 2010.
Office Action in U.S. Appl. No. 11/426,846 mailed May 12, 2010.
Qin, Shengchao; He, Jifeng; Chin, Wei Ngan "Towards an Automated Approach to Hardware/Software Decomposition" DSpace@MIT, Issue Date 2003, 12 pages.
Chung-Horny Lung; Xia Xu; Marzia Zaman "Software Architecture Decomposition Using Attributes" International Journal of Software Engineering and Knowledge Engineering vol. 17, Issue 5 (2007), pp. 599-613, Received Mar. 31, 2006, Accepted Oct. 16, 2006.
Sean Zhang; Barbara G. Ryder; William Landi "Program Decomposition for Pointer Aliasing: A Step Toward Practice Analyses-"SIGSOFT'96 CA, USA Copyright 1996 ACMO-89791-797-9/96/0010, pp. 81-92.
Bardram, Jakob E. "Activity-Based Computing: Support for Mobility and Collaboration in Ubiquitous Computing" Pers Ubiquit Comput 2005, vol. 9, pp. 312-322, Springer-Verlag London Limited 2005.
Bardram, Jakob E.; Christensen, Henrik Baerbak, "Real-Time Collaboration in Activity-Based Architectures" Proceedings of the Fourth Working IEEE/IFIP Conference on Software Architecture (WICSA'04) 0-7695-2172-X/04 Copyright 2004, IEEE, 4 pages.
Bardram, Jakob E., Bunde-Pedersen, Jonathan; Soegaard, Mads "Support for Activity-Based Computing in a Personal Computing Operating System" CHI 2006 Proceedings, Activity: Design Implications, Apr. 22-27, 2006, Montreal, Quebec, Canada, pp. 211-220.
Bardram, Jakob E.; Kjaer, Rasmus E.; Pedersen, Michael "Context-Aware User Authentication—Supporting Proximity-Based Login in Pervasive Computing" A.K. Dey et al. (Eds.): UbiComp 2003, LNCS 2864, pp. 107-123, 2003. Springer-Verlag Berlin Heidelberg 2003.
Office Action in U.S. Appl. No. 11/426,818 mailed Jun. 7, 2010.
Office Action in U.S. Appl. No. 11/426,832 mailed Jun. 23, 2010.
Final Office Action in U.S. Appl. No. 11/426,804 mailed Jul. 07, 2010.

* cited by examiner

ACTIVITY-CENTRIC DOMAIN SCOPING

CROSS REFERENCE TO RELATED APPLICATIONS

This application is related to U.S. Ser. No. 11/426,846 filed on Jun. 27, 2006, entitled "LOGGING USER ACTIONS WITHIN ACTIVITY CONTEXT"; 11/426,839 filed on Jun. 27, 2006, entitled "RESOURCE AVAILABILITY FOR USER ACTIVITIES ACROSS DEVICES"; 11/426,832 filed on Jun. 27, 2006, entitled "CAPTURE OF PROCESS KNOWLEDGE FOR USER ACTIVITIES"; 11/426,830 filed on Jun. 27, 2006, entitled "PROVIDING USER INFORMATION TO INTROSPECTION"; 11/426,818 filed on Jun. 27, 2006 and entitled "MONITORING GROUP ACTIVITIES"; 11/426,810 filed on Jun. 27, 2006, entitled "MANAGING ACTIVITY-CENTRIC ENVIRONMENTS VIA USER PROFILES"; 11/426,827 filed on Jun. 27, 2006, entitled "CREATING AND MANAGING ACTIVITY-CENTRIC WORKFLOW"; 11/426,804 filed on Jun. 27, 2006, entitled "ACTIVITY-CENTRIC ADAPTIVE USER INTERFACE"; and 11/426,788 filed on Jun. 27, 2006, entitled "ACTIVITY-CENTRIC GRANULAR APPLICATION FUNCTIONALITY". The entirety of each of the above applications is incorporated herein by reference.

BACKGROUND

Conventionally, communications between humans and machines have not been natural. Human-human communication typically involves spoken language combined with hand and facial gestures or expressions, and with the humans understanding the context of the communication. Human-machine communication is typically much more constrained, with devices like keyboards and mice for input, and symbolic or iconic images on a display for output, and with the machine understanding very little of the context. For example, although communication mechanisms (e.g., speech recognition systems) continue to develop, these systems do not automatically adapt to the activity of a user. As well, traditional systems do not consider contextual factors (e.g., user state, application state, environment conditions) to improve communications and interactivity between humans and machines.

Activity-centric concepts are generally directed to ways to make interaction with computers more natural (by providing some additional context for the communication). Traditionally, computer interaction centers around one of three pivots, 1) document-centric, 2) application-centric, and 3) device-centric. However, most conventional systems cannot operate upon more than one pivot simultaneously, and those that can do not provide much assistance managing the pivots. Hence, users are burdened with the tedious task of managing every little aspect of their tasks/activities.

A document-centric system refers to a system where a user first locates and opens a desired data file before being able to work with it. Similarly, conventional application-centric systems refer to first locating a desired application, then opening and/or creating a file or document using the desired application. Finally, a device-centric system refers to first choosing a device for a specific activity and then finding the desired application and/or document and subsequently working with the application and/or document with the chosen device.

Accordingly, since the traditional computer currently has little or no notion of activity built in to it, users are provided little direct support for translating the "real world" activity they are trying to use the computer to accomplish and the steps, resources and applications necessary on the computer to accomplish the "real world" activity. Thus, users traditionally have to assemble "activities" manually using the existing pieces (e.g., across documents, applications, and devices). As well, once users manually assemble these pieces into activities, they need to manage this list mentally, as there is little or no support for managing this on current systems.

All in all, the activity-centric concept is based upon the notion that users are leveraging a computer to complete some real world activity. Historically, a user has had to outline and prioritize the steps or actions necessary to complete a particular activity mentally before starting to work on that activity on the computer. Conventional systems do not provide for systems that enable the identification and decomposition of actions necessary to complete an activity. In other words, there is currently no integrated mechanism available that can dynamically understand what activity is taking place as well as what steps or actions are necessary to complete the activity.

Most often, the conventional computer system has used the desktop metaphor, where there was only one desktop. Moreover, these systems stored documents in a single filing cabinet. As the complexity of activities rises, and as the similarity of the activities diverges, this structure does not offer user-friendly access to necessary resources for a particular activity

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can automatically narrow the search space or recognition scope within an activity-centric environment based upon a current activity or set of activities. As such, natural language processing (NLP) as well as other types of conversion and recognition programs can dynamically adjust to the scope of the activity or group of activities thereby increasing the programs accuracy and usefulness. Additionally, the scoping functionality can facilitate effective activity-centric searching and ranking of results. Machine learning and reasoning (MLR) mechanisms can be employed to infer an activity and/or group of activities, as well as explicit user identification of activities, thus reducing the scope.

In operation, a user context, activity context, environment context and/or device profile can be employed to effectuate the scoping. As well, the system can combine context with extrinsic data, including but not limited to, calendar, profile, historical activity data, etc. in order to define the parameters for an appropriate scoping. Environmental and/or physiological sensors can be employed to assist in the definition of the scoping parameters.

In aspects, the system can separate personal and professional activities thereby managing scope and disambiguation accordingly. In one specific example, the system can use a current activity combined with a user context to improve speech and natural language recognition (e.g., scoping down to a domain based on activity). In doing so, the system can reduce the recognizable grammar and lexicon in view of the context thereby preserving processing power and battery life while improving the effectiveness of the recognition mechanisms.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
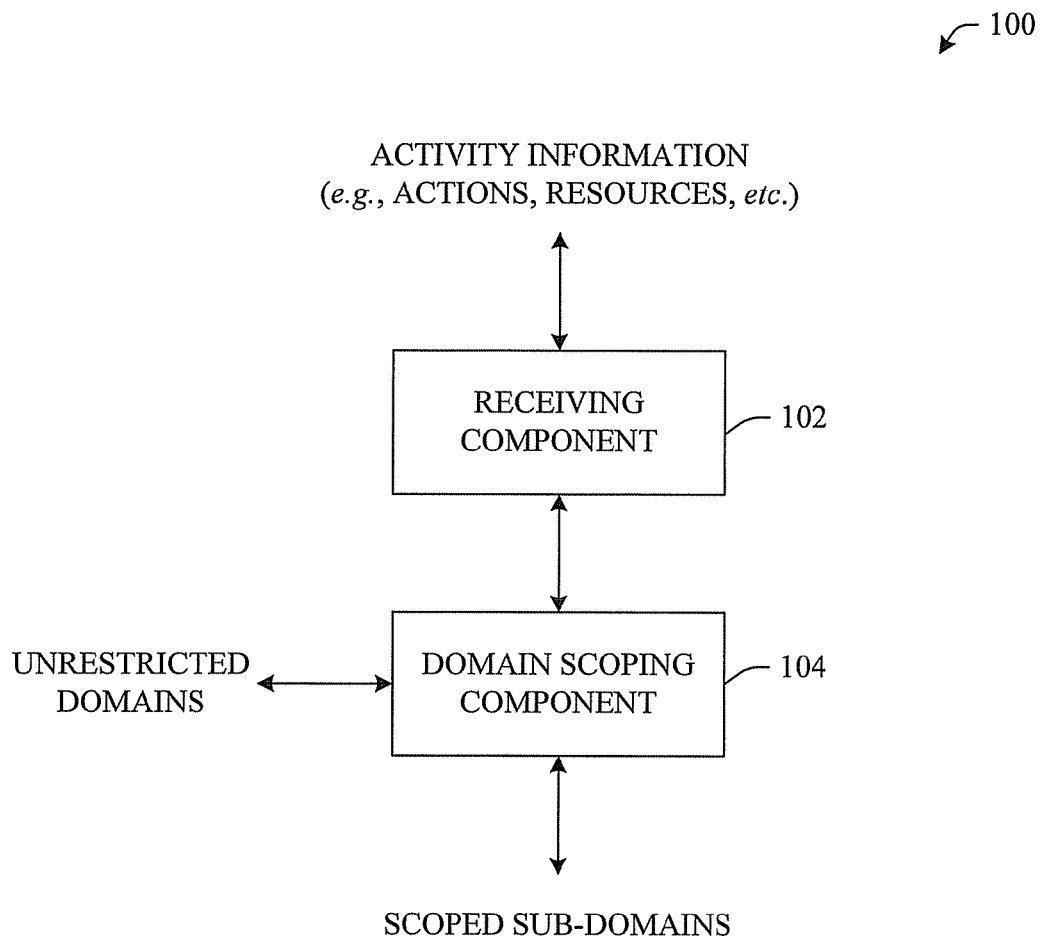
FIG. 1 illustrates a system that facilitates scoping a domain in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates a system 100 that can facilitate activity-centric scoping of a domain in accordance with an aspect of the innovation. This scoping can enhance communications and interactivity between humans and machines. Generally, system 100 can include a receiving component 102 and a domain scoping component 104. Together, these components (102, 104) can facilitate scoping a domain in accordance with an activity and/or group of activities. As will be understood upon a review of the figures that follow, a domain can include a single application or a group of applications, including associated resources (e.g., files, web links, functionalities, services, views).

In an aspect, the system 100 can scale down and define a scope for a domain and/or disambiguate recognition (e.g., natural language processing (NLP)) results with respect to an activity thereby enabling NLP to be more effective, accurate and useful. Conventionally, many NLP systems are designed and focused upon a particular area or topic where terms can be predefined and thereafter recognized.

In accordance with emerging PC-based speech recognition technologies, although limited in functionality, users can command and control the operating system (OS) and most applications via voice commands, where the commands are primarily composed of words taken from visible user interface (UI) elements being displayed on the screen. The major problem with this approach is that the user cannot speak naturally, as he would to another human. He must use the speech commands of the UI to navigate the hierarchal menus and other UI elements. Although it is possible to provide more natural grammars (alternative phrases) for the UI elements, the resulting large size of the lexicon and grammar to be recognized greatly reduces the accuracy of the speech recognition system.

However, in traditional systems, these voice commands must be learned by the system. In other words, conventional systems require a user to train the system. As well, voice commands have to be learned by the user as well in order to effectively interact with a computer system. Because many domains have very broad contexts thereby requiring broad grammars and lexicons, training the system via speech is not effective or sometimes even possible. By defining an activity-centric context (e.g., purchasing a new car), system 100 can reduce the size of the lexicon and grammar to just those phrases that are most relevant to the activity, increase the NLP accuracy, and thereby provide a more intuitive user interaction model.

Figure 2:
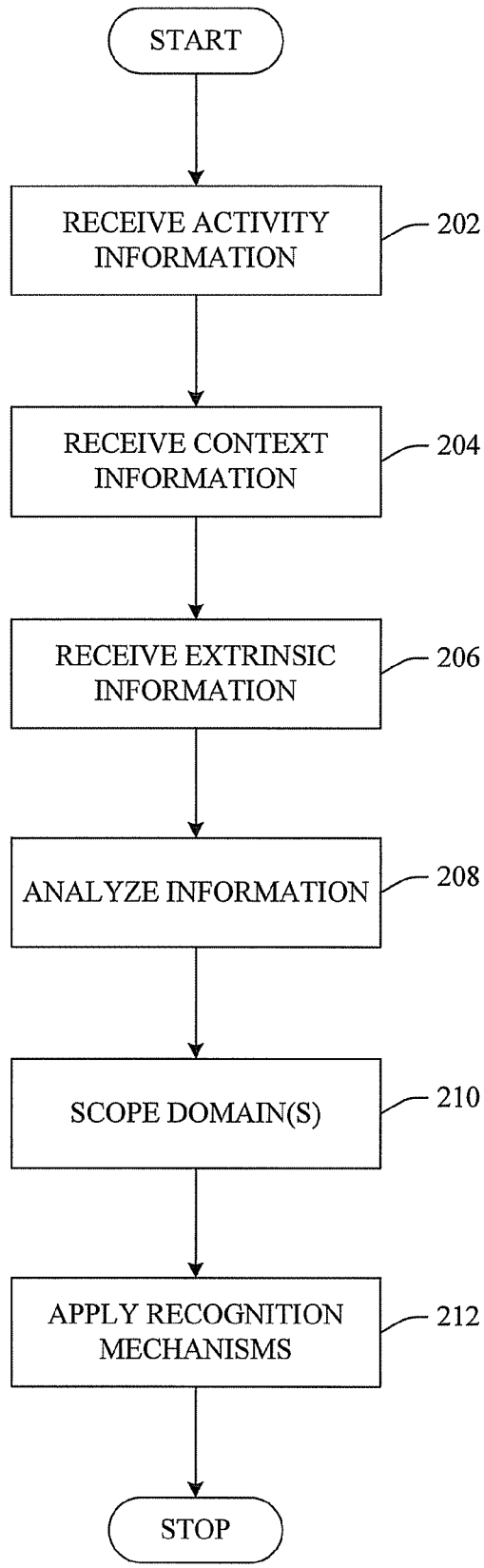
FIG. 2 illustrates an exemplary flow chart of procedures that facilitate establishing scoped sub-domains in accordance with an aspect of the innovation.

FIG. 2 illustrates a methodology of activity-centric scoping of a domain in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, activity information can be received which facilitates identification of an activity. Context information can be received and/or gathered at 204. The context information can include, but is not intended to be limited to, activity context, user context and environment context information. By way of example and not limitation, the activity context information can identify a type of activity, state within an activity, current step within an activity or the like. Similarly, user context can identify a user level of knowledge about an activity, interest in an activity, state of mind or the like. User context data can also be provided, which can include an NL profile that can identify a certain way the user speaks verbally, handwrites, or a communication style used in typed text. As well, user context data can include a search profile to help narrow the search or rank its results in a way that is more valuable/relevant for the user. Further, environment context can include time/date, location, weather, etc. Moreover, extrinsic data such as user calendar data, journal information, preferences or the like can be gathered at 206.

All of the gathered information can be analyzed at 208. Thus, at 210, domains (or sub-domains) can be scoped in accordance with the activity as a function of the gathered information. It will be appreciated that the gathered information can be employed to further define the activity information received at 202. Recognition systems can be applied at 212. In other words, dictionary terms or lexicons can be established in accordance with the scoped domain from 208.

In a particular example, the methodology can be used in a scenario where the activity is preparation of a living will. This information can be received at 202. Accordingly, at 204 and 206, additional information concerning the activity can be received, for example, user knowledge, state of mind, etc. In turn, a domain can be scoped to the particular activity of preparing a living will in view of the context and extrinsic information gathered. It will be understood that the scoping may differ for different users with different contexts. For example, it may not be necessary to apply as extensive of a legal vocabulary for a layperson as it may be for a lawyer. As such, the lexicon can be scoped not only in accordance with the activity but, also in accordance with members to the activity and other contextual criteria.

Figure 3:
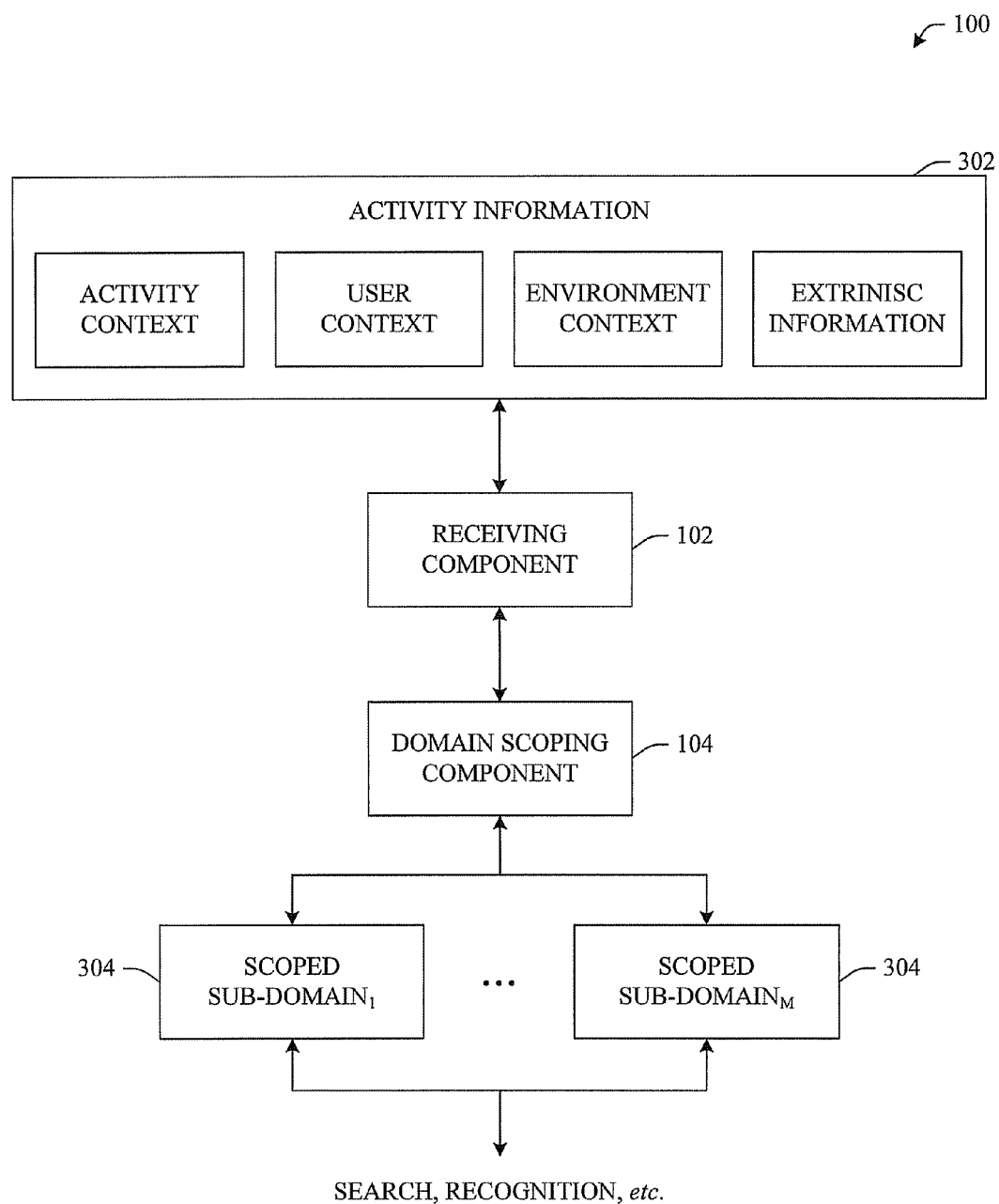
FIG. 3 illustrates a system that facilitates scoping a domain into multiple sub-domains based upon an activity context, user context, environment context and/or extrinsic information in accordance with an aspect of the innovation.

Referring now to FIG. 3, an alternative block diagram of system 100 is shown. As described supra, system 100 can facilitate scoping of a domain in accordance with an activity. In one aspect, scoping can enhance NLP related to the activity. In another aspect, reducing the scope of a domain associated with an activity can enhance other recognition-based searching associated with an activity.

In operation, the receiving component 102 can be employed to gather, access, obtain and/or compile activity information 302, including but not limited to, activity context, user context, environment context, etc. This information 302 can be employed by the domain scoping component 104 to establish 1 to M scoped sub-domains, where M is an integer. It is to be understood that 1 to M scoped sub-domains can be referred to collectively or individually as scoped sub-domain 304.

In an example, the domain scoping component 104 can identify multiple scoped sub-domains 304. Although multiple sub-domains 304 are shown in FIG. 3, it is to be understood that the innovation can establish a single scoped sub-domain with respect to a particular activity or group of activities. As well, it is to be understood that all, or a subset of the scoped sub-domains 304 can be located remotely.

In aspects, the scoped sub-domains 304 can be related to different aspects of an activity as a whole. For instance, consider an activity such as tax preparation. In accordance with this activity, the system 100 can scope multiple sub-domains 304 that correspond to individual aspects of the tax preparation activity. For example, one sub-domain 304 can be associated with gathering necessary information (e.g., wage reports, receipts, bank account information) while another sub-domain 304 can be scoped to the actual preparation of tax forms. It is to be understood that the lexicon used in preparation of tax forms includes more technical terminology than that needed to gather information for the filing of tax forms. By scoping the grammar, lexicon and application functionality with respect to the activity, human interaction and use can be enhanced.

In particular, by scoping sub-domains 304, this subject innovation can employ a natural language speech interface that makes interaction more natural with a computer. For interaction to be more natural, it is important to have natural language and speech capability throughout the whole system. However, as mentioned above, because activities can be large, the ability to use natural language speech throughout the system can pose many interpretation problems with respect to components of the system 100. Scoping the sub-domains 304 enables the grammar and lexicon to be more focused and streamlined based upon the activity and/or state within the activity.

Figure 4:
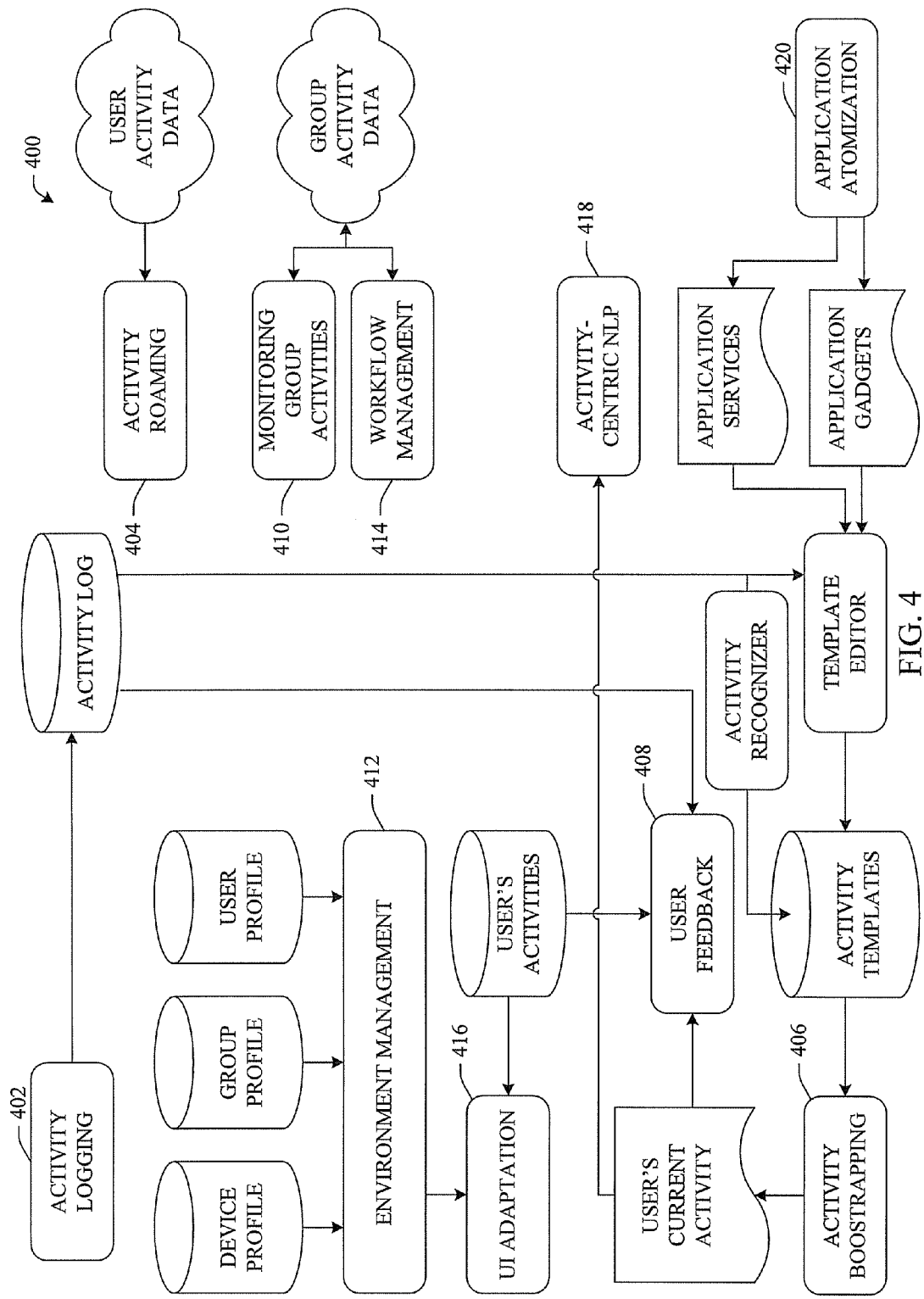
FIG. 4 illustrates an overall activity-centric system in accordance with an aspect of the innovation.

Turning now to FIG. 4, an overall activity-centric system 400 operable to perform novel functionality described herein is shown. As well, it is to be understood that the activity-centric system of FIG. 4 is illustrative of an exemplary system capable of performing the novel functionality of the Related Applications identified supra and incorporated by reference herein. Novel aspects of each of the components of system 400 are described below.

The novel activity-centric system 400 can enable users to define and organize their work, operations and/or actions into units called "activities." Accordingly, the system 400 offers a user experience centered on those activities, rather than pivoted based upon the applications and files of traditional systems. The activity-centric system 400 can also usually include a logging capability, which logs the user's actions for later use.

In accordance with the innovation, an activity typically includes or links to all the resources needed to perform the activity, including tasks, files, applications, web pages, people, email, and appointments. Some of the benefits of the activity-centric system 400 include easier navigation and management of resources within an activity, easier switching between activities, procedure knowledge capture and reuse, improved management of activities and people, and improved coordination among team members and between teams.

As described herein and illustrated in FIG. 4, the system 400 discloses an extended activity-centric system. However, the particular innovation (e.g., natural language and speech processing via activity domain scoping) disclosed herein is part of the larger, extended activity-centric system 400. An overview of this extended system 400 follows.

The "activity logging" component 402 can log the user's actions on a device to a local (or remote) data store. By way of example, these actions can include, but are not limited to include, resources opened, files changed, application actions, etc. As well, the activity logging component 402 can also log current activity and other related information. This data can be transferred to a server that holds the user's aggregated log information from all devices used. The logged data can later be used by the activity system in a variety of ways.

The "activity roaming" component 404 is responsible for storing each of the user's activities, including related resources and the "state" of open applications, on a server and making them available to the device(s) that the user is currently using. As well, the resources can be made available for use on devices that the user will use in the future or has used in the past. The activity roaming component 404 can accept activity data updates from devices and synchronize and/or collaborate them with the server data.

The "activity boot-strapping" component 406 can define the schema of an activity. In other words, the activity boot-strapping component 406 can define the types of items it can contain. As well, the component 406 can define how activity templates can be manually designed and authored. Further, the component 406 can support the automatic generation, and tuning of templates and allow users to start new activities using templates. Moreover, the component 406 is also responsible for template subscriptions, where changes to a template are replicated among all activities using that template.

The "user feedback" component 408 can use information from the activity log to provide the user with feedback on his activity progress. The feedback can be based upon comparing the user's current progress to a variety of sources, including previous performances of this or similar activities (using past activity log data) as well as to "standard" performance data published within related activity templates.

The "monitoring group activities" component 410 can use the log data and user profiles from one or more groups of users for a variety of benefits, including, but not limited to, finding experts in specific knowledge areas or activities, finding users that are having problems completing their activities, identifying activity dependencies and associated problems, and enhanced coordination of work among users through increased peer activity awareness.

The "environment management" component 412 can be responsible for knowing where the user is, the devices that are physically close to the user (and their capabilities), and helping the user select the devices used for the current activity. The component 412 is also responsible for knowing which remote devices might be appropriate to use with the current activity (e.g., for processing needs or printing).

The "workflow management" component 414 can be responsible for management and transfer of work items that involve other users or asynchronous services. The assignment/transfer of work items can be ad-hoc, for example, when a user decides to mail a document to another user for review. Alternatively, the assignment/transfer of work items can be structured, for example, where the transfer of work is governed by a set of pre-authored rules. In addition, the workflow manager 414 can maintain an "activity state" for workflow-capable activities. This state can describe the status of each item in the activity, for example, which it is assigned to, where the latest version of the item is, etc.

The "UI adaptation" component 416 can support changing the "shape" of the user's desktop and applications according to the current activity, the available devices, and the user's skills, knowledge, preferences, policies, and various other factors. The contents and appearance of the user's desktop, for example, the applications, resources, windows, and gadgets that are shown, can be controlled by associated information within the current activity. Additionally, applications can query the current activity, the current "step" within the activity, and other user and environment factors, to change their shape and expose or hide specific controls, editors, menus, and other interface elements that comprise the application's user experience.

The "activity-centric recognition" component or "activity-centric natural language processing (NLP) component 418 can expose information about the current activity, as well as user profile and environment information in order to supply context in a standardized format that can help improve the recognition performance of various technologies, including speech recognition, natural language recognition, optical character recognition, handwriting recognition, gesture recognition, desktop search, and web search.

Finally, the "application atomization" component 420 represents tools and runtime to support the designing of new applications that consist of services and gadgets. This enables more fine-grained UI adaptation, in terms of template-defined desktops, as well as adapting applications. The services and gadgets designed by these tools can include optional rich behaviors, which allow them to be accessed by users on thin clients, but deliver richer experiences for users on devices with additional capabilities.

In accordance with the activity-centric environment 400, once the computer understands the activity, it can adapt to that activity. For example, if the activity is the review of a multi-media presentation, the application can display the information differently as opposed to an activity of the UI employed in creating a multi-media presentation. All in all, the computer can react and tailor functionality and the UI characteristics based upon a current state and/or activity. The system 400 can understand how to bundle up the work based upon a particular activity. Additionally, the system 400 can monitor actions and automatically bundle them up into an appropriate activity or group of activities. The computer will also be able to associate a particular user to a particular activity, thereby further personalizing the user experience.

In summary, the activity-centric concept of the subject system 400 is based upon the notion that users can leverage a computer to complete some real world activity. As described supra, historically, a user would outline and prioritize the steps or actions necessary to complete a particular activity mentally before starting to work on that activity on the computer. In other words, conventional systems do not provide for systems that enable the identification and decomposition of actions necessary to complete an activity.

The novel activity-centric systems enable automating knowledge capture and leveraging the knowledge with respect to previously completed activities. In other words, in one aspect, once an activity is completed, the subject innovation can infer and remember what steps were necessary when completing the activity. Thus, when a similar or related activity is commenced, the activity-centric system can leverage this knowledge by automating some or all of the steps necessary to complete the activity. Similarly, the system could identify the individuals related to an activity, steps necessary to complete an activity, documents necessary to complete, etc. Thus, a context can be established that can help to complete the activity next time it is necessary to complete. As well, the knowledge of the activity that has been captured can be shared with other users that require that knowledge to complete the same or a similar activity.

Historically, the computer has used the desktop metaphor, where there was effectively only one desktop. Moreover, conventional systems stored documents in a filing cabinet, where there was only one filing cabinet. As the complexity of activities rises, and as the similarity of the activities diverges, it can be useful to have many desktops available that can utilize identification of these similarities in order to streamline activities. Each individual desktop can be designed to achieve a particular activity. It is a novel feature of the innovation to build this activity-centric infrastructure into the operating system such that every activity developer and user can benefit from the overall infrastructure.

The activity-centric system proposed herein is made up of a number of components as illustrated in FIG. 4. It is the combination and interaction of these components that compromises an activity-centric computing environment and facilitates the specific novel functionality described herein. At the lowest level the following components make up the core infrastructure that is needed to support the activity-centric computing environment; Logging application/user actions within the context of activities, User profiles and activity-centric environments, Activity-centric adaptive user interfaces, Resource availability for user activities across multiple devices and Granular applications/web-services functionality factoring around user activities. Leveraging these core capabilities with a number of higher-level functions are possible, including; providing user information to introspection, creating and managing workflow around user activities, capturing ad-hoc and authored process and technique knowledge for user activities, improving natural language and speech processing by activity scoping, and monitoring group activity.

Figure 5:
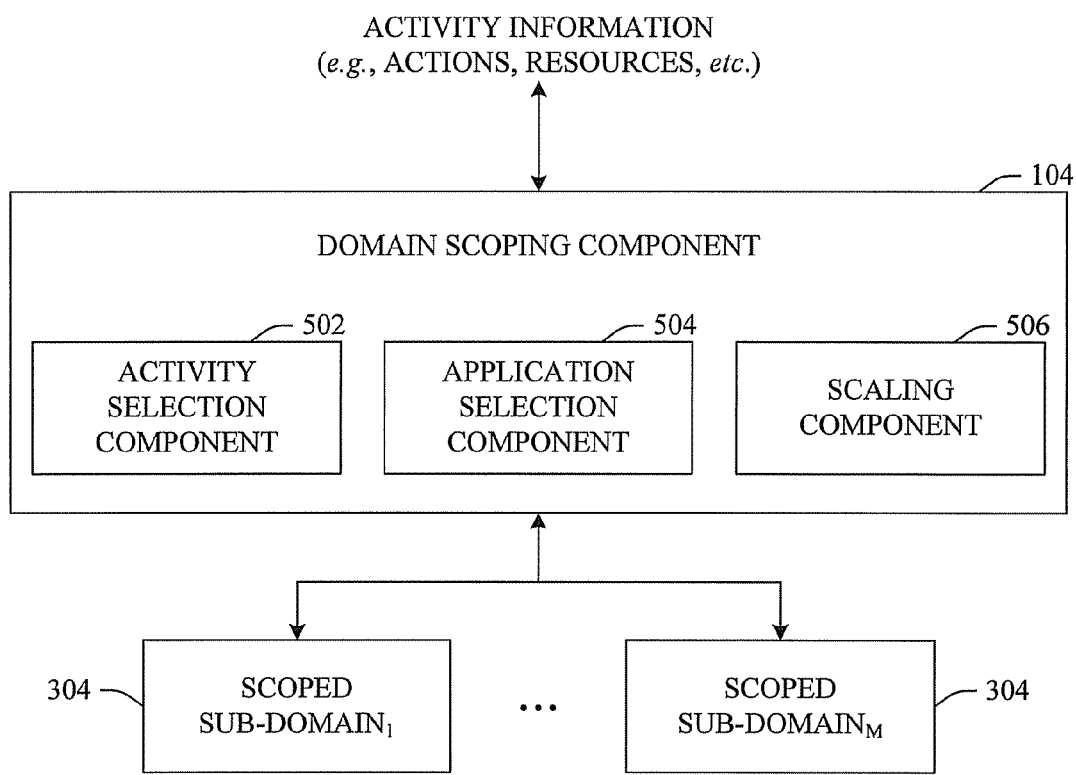
FIG. 5 illustrates a block diagram of a domain scoping component in accordance with an aspect of the innovation.

Referring now to FIG. 5, an alternative block diagram of domain scoping component 104 is shown. As illustrated, domain scoping component 104 can include an activity selection component 502, an application selection component 504 and a scaling component 506. In operation, these components (502-506) can facilitate automatically narrowing the search space or recognition scope within an activity-centric environment based upon a current activity or set of activities. As such, natural language processing (NLP), as well as other types of recognition and translation programs, can dynamically adjust to the scope of the current activity or group of activities. Additionally, the scoping functionality (e.g., scaling component 506) can facilitate activity-centric searching within a sub-domain (e.g., 304) specific to an activity or task of an activity.

As described supra, in order to make human interaction more natural with a computer, the innovation discloses mechanisms (e.g., domain scoping component 104) that can automatically scope down the domain into activity-centric sub-domains 304. For example, the innovation can infer a current activity and automatically scope down an application or a domain that corresponds to the activity. In particular examples, the system can automatically scope a rich domain around legal or medical terms for dictation. In accordance therewith, it will be appreciated that if the current activity involves reporting lab results for a patient, the grammar and lexicon can be much more constrained than if the activity involves recording a patient history (which can be very unconstrained). In operation, the innovation can scope down a complete system into application sub-domains 304 based upon a current activity.

As well, in other aspects, application functionality can be scaled in accordance with an activity thereby providing more focused NLP capabilities. Scaling the application functionality can be employed to effectively scale the grammar and lexicon in accordance with an activity. This is particularly important since activity-centric systems that are speech and/or language enabled often include scenarios that cross applications and/or scenarios that span applications and the operating system.

Given the context of the activity that a user is working on, the activity selection component 502 and application selection component 504 can use the context characteristics as a mechanism to select aspects of the system to scope down thereby providing for enhanced natural language speech, recognition, and search capabilities. As a result, the scoping can provide the user with a much larger, yet focused, space to work. In operation, the system can scope the interpretation to distinguish the types of words/phrases a user is likely to input within the context of an activity from those that the user would not input within the context of the activity.

Figure 6:
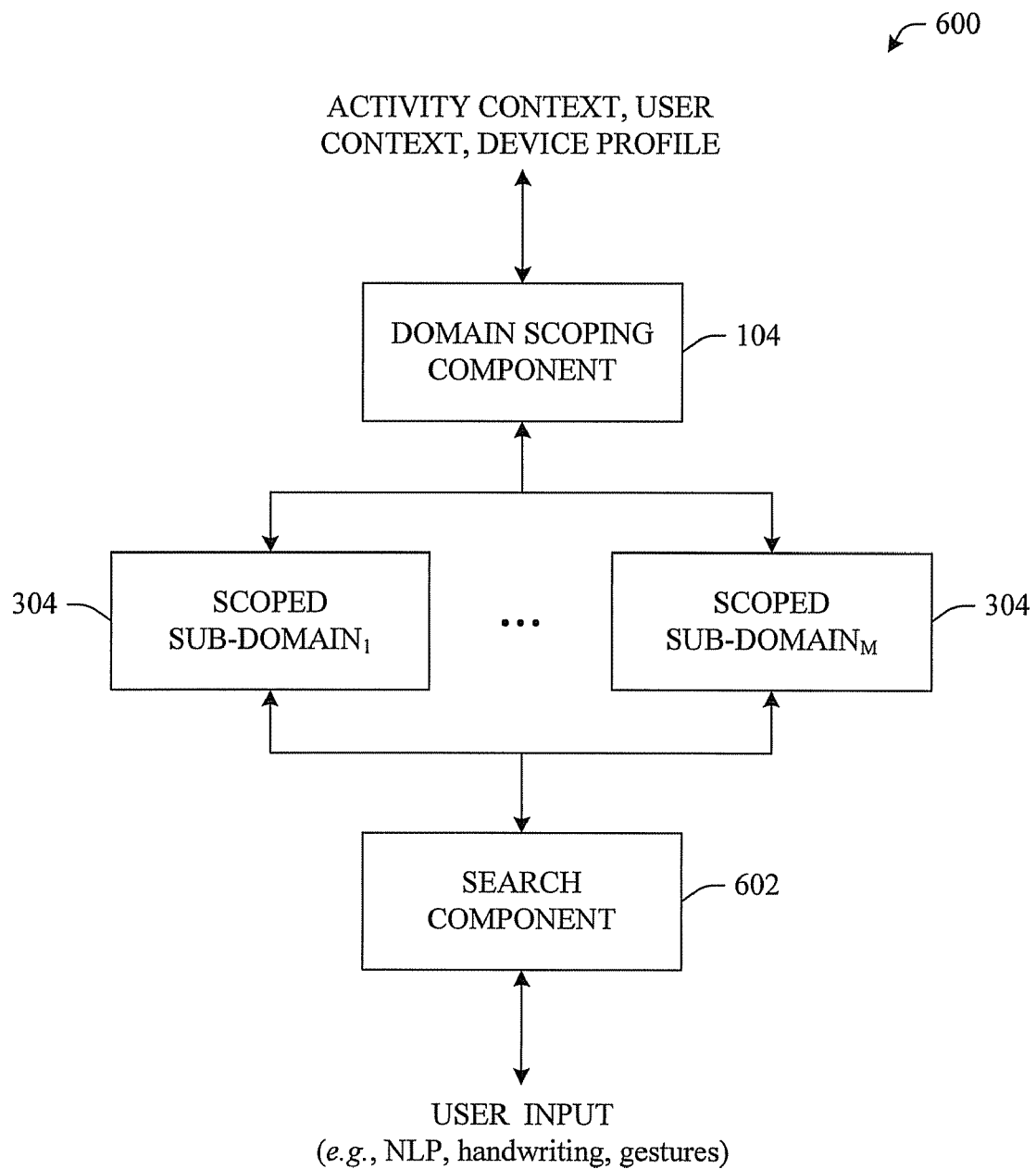
FIG. 6 illustrates a domain scoping system that employs a search component in accordance with an aspect of the innovation.

FIG. 6 illustrates a system 600 that facilitates searching the scoped sub-domains 304 in accordance with an aspect of the innovation. More particularly, system 600 includes a search component 602 that enables NLP search of the scoped sub-domains 304. As described above, the subject innovation uses activity as a benchmark to scope a domain with respect to natural language speech and search functionality. The innovation is not only directed to what can be said and interpreted, but also how the disambiguation of the translated content is accomplished. Effectively, this disambiguation operation of the domain scoping component 104 is completely transparent to the user and can provide an effective means of searching within the activity-centric environment. The scoped sub-domains 304 facilitate this enhanced functionality.

In aspects, the system 600 can separate professional and personal activities. For example, the system 600 can use the activity context, user context (time, location), environment context, and/or device profile (office versus home PC versus cell phone) to either constrain or narrow the scope of an activity or an action within an activity. As well, these factors can be employed to manage recognition action, access control, permissions, etc. In addition to the recognition being NLP, the system can be employed in connection with recognition of other input modalities such as, handwriting recognition, gesture recognition, etc. Although aspects described herein are specifically directed to NLP, it is to be understood that the recognition of other input modalities (e.g., handwriting, gestures) are to be included within the scope of this disclosure and claims appended hereto.

In addition to activity context, the subject innovation can also scope based upon other pivots such as user state, user knowledge/capabilities, device capabilities, etc. For example, user knowledge/capability information can be obtained from profile information and/or inferred from user actions and/or state. Effectively, the scope can be based upon any combination of factors thereby providing focus with respect to recognition mechanisms, for example, NLP.

In disparate aspects, the vocabularies can be explicitly authored by a user or can be automatically generated by monitoring a user's (or group of users') history with respect to an activity. Also, a base vocabulary can be established and built upon by dynamically monitoring activities and actions. In addition, the system 600 can consider factors as to when the user performed an action, number of times an action was performed, etc. in determining a scope of a sub-domain 304.

In addition to scoping activity resource search functionality with respect to recognition processing, the system can enable scoping to provide enhanced assistance/help, permissions, system settings, etc. It is to be understood that most any functionality associated with an activity can be scoped in accordance with the innovation. For example, the system can also scope to enable NLP control of the activity logging.

The functionality of this innovation discloses mechanisms for scoping and disambiguating based upon an activity in the generic sense. As shown in FIG. 6, specific embodiments of the innovation are directed to leveraging the functionality in searching scenarios with respect to recognition processing. For example, aspects of the innovation provide for searching for resources (e.g., web resources, local resources, organization resources) within an activity or group of activities. In one scenario, this search can be effectuated via the use of annotations within an activity log.

A "resource" can refer to any resource, for example, resources within activities, and resources outside the scope of activities. For example, a resource can be a web page, files on a disk, items on a desktop, etc. Resources can be most anything (e.g., files, websites, links, etc.) associated with an activity.

In a specific example, with respect to web search, the innovation can render results based solely upon the keywords spoken and/or inputted as well as results based upon the keywords in the context of a current activity (or a group of current or non-current activities that a user is a member). A third set of results can be rendered based upon a specific user within the context of the activity. For example, the system can consider a user's role within the activity and render results accordingly.

The system 600 can determine if a user is multitasking as well as if a user is merely using multiple devices to accomplish a particular task. As such, search results can be rendered accordingly. The innovation can generate keywords from the activity and either scope the search within the sub-domains (e.g., 304) of the activity or surf the results in accordance with the activity. In another aspect, the system can meta-tag results based upon an activity thereby making the results searchable based upon the activity.

Rather than, or in addition to, titling activities and/or sub-domains 304, the innovation can employ tags as identifiers. In addition to the tags being meaningful in the social networking space, the tags can also be leveraged within the search context. As well, the innovation can generate tags from an activity title and vice versa.

Turning again to scoping and disambiguation—In an effort to learn, the system can aggregate feedback around an activity. For example, the system can determine that people working within an activity use particular search terms and usually select item X. This feedback can be useful to build a learning model around activities and sub-domains 304. The grammars and lexicons that are built at the higher activity level can be shared with the specialized activity. In other words, for example, if a user establishes a finance grammar and lexicon around a budgeting activity, this grammar and lexicon can live within the specialized budget activity (e.g., sub-domain 304). This will give the system the ability to have a grammar that moves with the activity thus, effectuating scoping and disambiguation. As well, this data could be captured into an activity template, so that new activities take advantage of it.

Generally, tagging is unstructured, however, the innovation can define a resource structure with respect to the tagging. For example, personal versus professional resources can be distinguished within disparate sub-domains 304 through the use of tags which enable scoping with respect to these pivots. Additionally, these tags can be employed to pivot policies, for example, content filtering, permissions, security, etc.

Another way the system facilitates scoping and disambiguation is through developing relationships. For instance, items a user works on at the same time become associated to the user and the subject activity. Similarly, items the user works on at the same time develop a relationship between the items. Essentially, the innovation discloses classes of activities and classes of uses that establish a hierarchy. The system can establish explicit relationships as well as implicit relationships between the items.

A person's contact information creates a relationship between people—this contact information is a resource. Rich information about a person, e.g., brain waves, heart rate, respiration rate, galvanic skin response, environmental data, is interesting data about the person which can be interrelated. As well, all of this information can have a relationship with an activity.

Other aspects of the innovation can employ an artificial intelligence (AI) or machine learning and/or reasoning (MLR) component (not shown) which facilitates automating one or more features in accordance with the subject innovation. The subject innovation (e.g., in connection with defining an appropriate scope) can employ various MLR-based schemes for carrying out various aspects thereof. For example, a process for determining a level of scoping can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic, statistical and/or decision theoretic-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. By defining and applying a kernel function to the input data, the SVM can learn a non-linear hypersurface. Other directed and undirected model classification approaches include, e.g., decision trees, neural networks, fuzzy logic models, naïve Bayes, Bayesian networks and other probabilistic classification models providing different patterns of independence can be employed.

As will be readily appreciated from the subject specification, the innovation can employ classifiers that are explicitly trained (e.g., via a generic training data) as well as implicitly trained (e.g., via observing user behavior, receiving extrinsic information). For example, the parameters on an SVM are estimated via a learning or training phase. Thus, the classifier (s) can be used to automatically learn and perform a number of functions, including but not limited to determining, according to a predetermined criteria, a current activity as well as a level of scoping with respect to the sub-domains of the activity.

Figure 7:
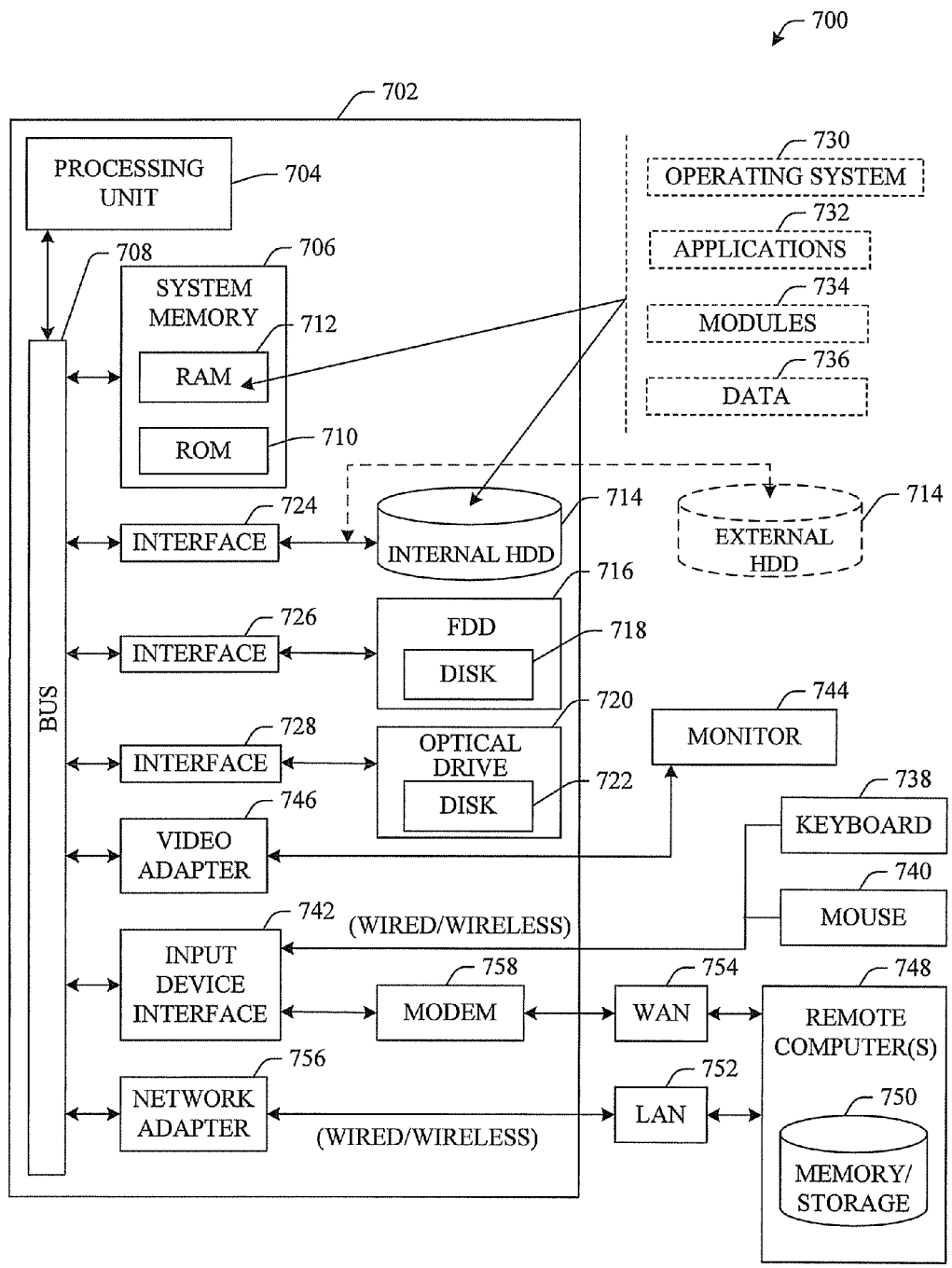
FIG. 7 illustrates a block diagram of a computer operable to execute the disclosed architecture.

Referring now to FIG. 7, there is illustrated a block diagram of a computer operable to execute the disclosed architecture of scoping a domain in accordance with an aspect of the innovation. In order to provide additional context for various aspects of the subject innovation, FIG. 7 and the following discussion are intended to provide a brief, general description of a suitable computing environment 700 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects of the innovation includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a nonvolatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the innovation can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
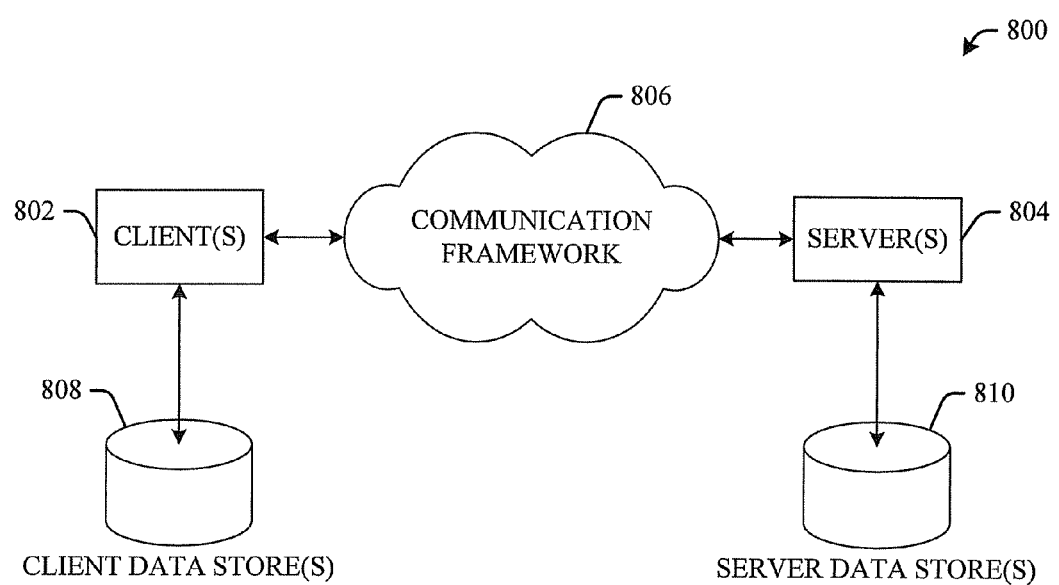
FIG. 8 illustrates a schematic block diagram of an exemplary computing environment in accordance with the subject innovation.

Referring now to FIG. 8, there is illustrated a schematic block diagram of an exemplary computing environment 800 in accordance with the subject innovation. The system 800 includes one or more client(s) 802. The client(s) 802 can be hardware and/or software (e.g., threads, processes, computing devices). The client(s) 802 can house cookie(s) and/or associated contextual information by employing the innovation, for example.

The system 800 also includes one or more server(s) 804. The server(s) 804 can also be hardware and/or software (e.g., threads, processes, computing devices). The servers 804 can house threads to perform transformations by employing the innovation, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client (s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. Computer storage media having a system embodied thereon including computer-executable instructions that, when executed, perform a method for facilitating focusing of a domain, the system comprising:
    a receiving component that accesses information related to an activity a user is attempting to accomplish, wherein the accessed information comprises information related to at least one of a lithe user, the user's environment, or the activity; and
    a domain scoping component that automatically scopes the domain into a plurality of sub-domains to facilitate accomplishment of the activity by reducing the domain resources available and narrowing a search space or recognition scope,
        wherein the domain comprises resources including one or more applications and at least one of one or more files, web links, functionalities, services, or views,
        wherein each sub-domain includes a subset of the resources in the domain, and
        wherein the domain scoping component comprises:
            an activity selection component that infers the activity the user is attempting to accomplish from the accessed information,
            an application selection component that identifies domain resources, including one or more applications, to limit access to or functionality of for each sub-domain based on the inferred activity, and
            a scaling component that limits access to or functionality of applications and other resources identified by the application selection component for each sub-domain to provide a focused workspace, including narrowing a grammar and lexicon available for recognition in natural language and speech processing to provide more efficient processing by limiting the number of words and grammatical constructs against which a language or speech input is compared during processing.

2. The media of claim 1, wherein the domain scoping component enhances recognition-based searching associated with the activity the user is attempting to accomplish.

3. The media of claim 1, wherein the domain scoping component scopes the domain based at least in part upon context information.

4. The media of claim 3, wherein the context information comprises environment context information.

5. The media of claim 3, wherein the context information comprises activity context information.

6. The media of claim 3, wherein the context information comprises user context information.

7. The media of claim 1, wherein the receiving component monitors user action to identify and update the activity information.

8. The media of claim 2, wherein the system further comprises a search component that facilitates searching a subset of the plurality of sub-domains based at least in part upon a user input.

9. The media of claim 8, wherein the user input is a speech input, and wherein the search component facilitates natural language processing (NLP) of the speech input based at least in part upon the grammar and lexicon available for recognition in natural language and speech processing in each sub-domain.

10. The media of claim 1, wherein the system further comprises a machine learning and reasoning component that facilitates automatic determination of the grammar and lexicon available for recognition in natural language and speech processing in each sub-domain, and wherein the grammar and lexicon available in each sub-domain are maintained within the sub-domain.

11. One or more computer storage media storing computer-executable instructions for performing a method of applying a recognition system in accordance with a non-search activity a user is attempting to accomplish by using a computing device, the method comprising:
   accessing information related to a non-search activity a user is attempting to accomplish, wherein the accessed information comprises information related to at least one of the user, the user's environment, or the activity;
   inferring the non-search activity the user is attempting to accomplish from the accessed information;
   determining a domain comprising resources including one or more applications and at least one of one or more files, web links, functionalities, services, or views;
   scoping the domain into a plurality of sub-domains to facilitate accomplishment of the activity by:
   identifying domain resources, including one or more applications, to limit access to or functionality of for each sub-domain based on the activity, and
   limiting the access to or functionality of applications and other identified resources for each sub-domain to provide a focused workspace;
   for each sub-domain:
   narrowing a grammar and lexicon available for recognition in natural language and speech processing to provide more efficient processing by limiting the number of words and grammatical constructs against which a language or speech input is compared during processing, and
   maintaining the narrowed grammar and lexicon in the sub-domain; and
   interpreting a user input based at least in part upon a subset of the plurality of sub-domains.

12. The computer storage media of claim 11, wherein the method further comprises:
   gathering context information; and
   employing the context information in scoping the domain into the plurality of sub-domains.

13. The computer storage media of claim 11, wherein the domain comprises a plurality of applications.

14. One or more computer storage media storing computer-executable instructions for performing a method of interpreting a user input, the method comprising:
   accessing information related to an activity a user is attempting to accomplish, wherein the accessed information comprises information related to at least one of a user, the user's environment, or the activity;
   inferring the activity the user is attempting to accomplish from the accessed information;
   determining a domain comprising resources including one or more applications and at least one of one or more files, web links, functionalities, services, or views;
   automatically scoping a domain into a plurality of sub-domains to facilitate accomplishment of the activity by:
   identifying domain resources, including one or more applications, to limit access to or functionality of for each sub-domain based on the activity, and
   limiting the access to or functionality of applications and other identified resources for each sub-domain to provide a focused workspace;
   for each sub-domain:
   narrowing a grammar and lexicon available for recognition in natural language and speech processing to provide more efficient processing by limiting the number of words and grammatical constructs against which a language or speech input is compared during processing, and
   maintaining the narrowed grammar and lexicon in the sub-domain; and
   interpreting a user input based at least in part upon the grammar and lexicon associated with the one or more of the plurality of sub-domains.

15. The computer storage media of claim 14, wherein the user input is a spoken phrase.

16. The computer storage media of claim 15, wherein the identified domain comprises a plurality of applications.

* * * * *

UNITED STATES PATENT AND TRADEMARK OFFICE
CERTIFICATE OF CORRECTION

| | | |
|---|---|---|
| PATENT NO. | : 7,836,002 B2 | Page 1 of 1 |
| APPLICATION NO. | : 11/426796 | |
| DATED | : November 16, 2010 | |
| INVENTOR(S) | : Steven W. Macbeth et al. | |

It is certified that error appears in the above-identified patent and that said Letters Patent is hereby corrected as shown below:

In column 16, line 32, in Claim 1, delete "a lithe" and insert -- the --, therefor.

Signed and Sealed this
Tenth Day of May, 2011

David J. Kappos
*Director of the United States Patent and Trademark Office*